United States Patent
Teskey (10) Patent No.: US 10,847,001 B2
(45) Date of Patent: Nov. 24, 2020

(54) SYSTEMS TO DETECT THE PRESENCE OF INTRUDER DEVICES IN A HOME ENVIRONMENT

(71) Applicant: WIRELESS ID LLC, Toledo, OH (US)

(72) Inventor: Doug Teskey, Toledo, OH (US)

(73) Assignee: WIRELESS ID LLC, Toledo, OH (US)

( * ) Notice: Subject to any disclaimer, the term of this patent is extended or adjusted under 35 U.S.C. 154(b) by 0 days.

(21) Appl. No.: 16/681,543

(22) Filed: Nov. 12, 2019

(65) Prior Publication Data

US 2020/0160674 A1    May 21, 2020

Related U.S. Application Data

(60) Provisional application No. 62/770,075, filed on Nov. 20, 2018.

(51) Int. Cl.
| | | |
|---|---|---|
| *G08B 13/00* | (2006.01) | |
| *H04W 4/029* | (2018.01) | |
| *H04W 8/00* | (2009.01) | |
| *G08B 25/00* | (2006.01) | |

(52) U.S. Cl.
CPC ............ *G08B 13/00* (2013.01); *G08B 25/002* (2013.01); *H04W 4/029* (2018.02); *H04W 8/005* (2013.01)

(58) Field of Classification Search
None
See application file for complete search history.

(56) References Cited

U.S. PATENT DOCUMENTS

| | | | |
|---|---|---|---|
| 6,986,161 B2 | 1/2006 | Billhartz | |
| 9,659,474 B1* | 5/2017 | Kashyap | ................ G08B 13/00 |
| 9,990,822 B2 | 6/2018 | Emmanuel et al. | |
| 2011/0141276 A1* | 6/2011 | Borghei | ................ H04W 12/08 |
| | | | 348/143 |

(Continued)

OTHER PUBLICATIONS

Adam Tanner, "Here's How Others Can Easily Snoop on Your Cell Phone", Forbes.com, https://www.forbes.com/sites/adamtanner/2014/02/18/heres-how-others-can-easily-snoop-on-your-.

(Continued)

*Primary Examiner* — Thomas S McCormack (57) ABSTRACT

Various embodiments of systems to detect the presence of intruder devices in home environments are disclosed. The system includes a home hub positioned proximate to a home; a security sensor positioned proximate to the home and communicatively coupled to the home hub; a transceiver, and a control circuit communicatively coupled to the home hub, the database, and the transceiver. The security sensor detects security events associated with the home and transmits notifications of the security event to the home hub. The control circuit is configured to: receive trigger events when the home hub receives the notification; in response to receiving the trigger event, capture wireless traffic; determine whether the wireless traffic includes unknown device identification information; and generate another notification when the wireless traffic includes the unknown device identification information, the other notification includes the unknown device identification information. Security events include open doors, open windows, and broken glass.

12 Claims, 4 Drawing Sheets

(56) References Cited

U.S. PATENT DOCUMENTS

| | | | | |
|---|---|---|---|---|
| 2011/0314542 | A1* | 12/2011 | Viswanathan | H04W 12/1208 |
| | | | | 726/23 |
| 2015/0097689 | A1* | 4/2015 | Logue | H04L 65/1036 |
| | | | | 340/632 |
| 2016/0189496 | A1* | 6/2016 | Modi | G08B 13/08 |
| | | | | 340/545.2 |
| 2016/0189509 | A1* | 6/2016 | Malhotra | G08B 21/18 |
| | | | | 340/541 |
| 2018/0040217 | A1 | 2/2018 | Feldman et al. | |

OTHER PUBLICATIONS

SimpliSafe, https://simplisafe.com/build-my-system.
ADT, https://security.adt.com/s/d/secureyourhome/.

* cited by examiner

SYSTEMS TO DETECT THE PRESENCE OF INTRUDER DEVICES IN A HOME ENVIRONMENT

CROSS-REFERENCE TO RELATED APPLICATIONS

This application claims priority to U.S. Provisional Application No. 62/770,075 filed Nov. 20, 2018, which is hereby incorporated herein by reference.

FIELD OF THE INVENTION

The present disclosure relates generally to home security. More specifically, the present disclosure relates to systems to detect the presence of intruder devices in a home environment.

BACKGROUND OF THE INVENTION

Home security typically includes both the security hardware in place on a property as well as personal security practices. For example, security hardware includes doors, locks, alarm systems, lighting, motion detectors, security camera systems, as well as similar devices and apparatuses that are installed on a property. Personal security involves practices, such as ensuring doors are locked, alarms activated, windows closed, extra keys not hidden outside, and similar methods.

Home and personal security are major areas of concern for individuals. Accordingly, developments have been made in the field of security systems to aid in intrusion detection. Further, security systems are capable of detecting intrusions with high precision, with a number of false alarms generated by security systems decreasing.

BRIEF DESCRIPTION OF THE DRAWINGS

Some of the embodiments will be described in detail, with reference to the following figures, wherein like designations denote like members, wherein.

Unless otherwise specifically noted, articles depicted in the drawings are not necessarily drawn to scale.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the disclosed aspects of the disclosure and may further incorporate only one or a plurality of the disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of detection of presence of one or more intruder devices, embodiments of the present disclosure are not limited to use only in this context.

Home security typically includes both the security hardware in place on a property as well as personal security practices. For example, security hardware includes doors, locks, alarm systems, lighting, motion detectors, security camera systems, as well as similar devices and apparatuses that are installed on a property. Personal security involves practices, such as ensuring doors are locked, alarms activated, windows closed, extra keys not hidden outside, and similar methods.

Home and personal security are major areas of concern for individuals. Accordingly, developments have been made in the field of security systems to aid in intrusion detection. Further, security systems are capable of detecting intrusions with high precision, with a number of false alarms generated by security systems decreasing. However, development in the field is progressing along expected lines. For example, most security systems remain focused in detecting and preventing intrusions by individuals, mostly making use of imaging systems to identify intruders. Existing systems are typically unable to detect the presence of intruder devices. As used herein, "intruder devices" are mobile devices carried on the person of intruders within the property of interest. Further, existing security systems are typically unable to capture unique characteristics associated with intruder devices that may aid in the location of said intruders through tracking of the intruder devices.

Therefore, there is a need for improved systems and methods to detect the presence of intruder devices in home environments that may overcome one or more of the above-mentioned problems and/or limitations. Embodiments disclosed herein seek to convey systems and methods for detecting the presence of intruder devices in home environments.

Figure 1:
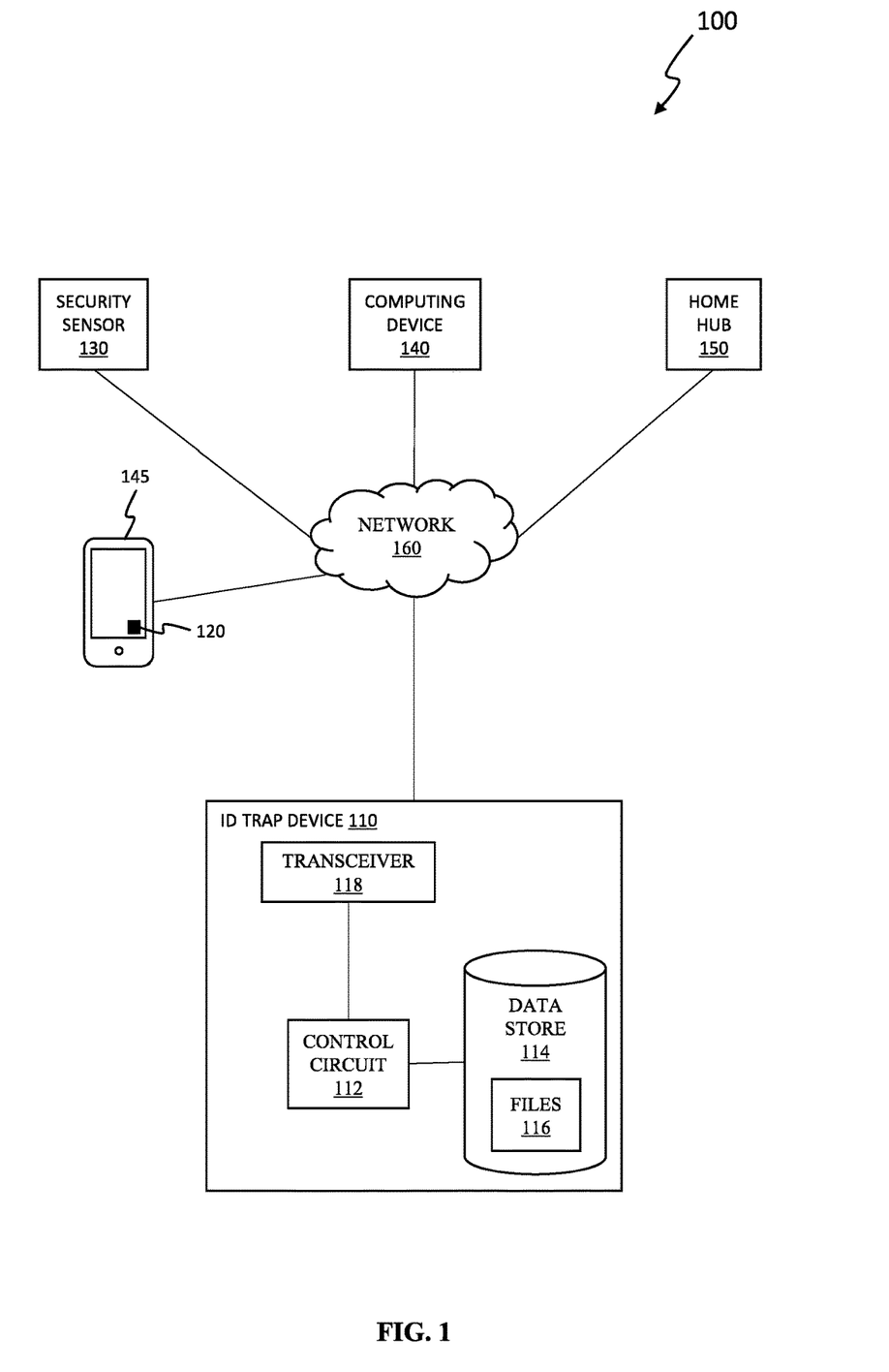
FIG. 1 depicts an environment for detecting the presence of an intruder device in a home according to some embodiments.

FIG. 1 depicts an environment, generally 100, for detecting the presence of intruder devices in a home environment according to some embodiments. In certain embodiments, environment 100 includes identification ("ID") trap device 110, at least one security sensor 130, computing device 140, and home hub 150 all in communication via network 160. Network 160 can be, for example, a local area network ("LAN"), a wide area network ("WAN"), such as the internet, a distributed computing environment, cluster computing environment, or a combination of two or more thereof, and can include wired, wireless, or fiber optic connections. Network 160 can be compatible with a variety of communications protocols, such as those associated with Bluetooth, Wi-Fi, LTE, cellular, radio, microwave, as well as other wireless communication protocols. In general, network 160 can be any combination of connections and protocols that will support communications between ID trap device 110, security sensor 130, computing device 140, and home hub 150.

As used herein, a "smart home" refers to homes/dwellings that have appliances, lighting and/or electronic devices that can be controlled remotely by the owner, often via a home hub (e.g., home hub 150). As used herein, "smart home-enabled devices" or "smart devices" refer to computing devices that can operate in conjunction with other computing devices in the home and communicate information to other smart devices. In some embodiments, home hub 150 is a computing device that facilitates communications between smart home devices, such as security sensors 130, which include, but are not limited to, doorbells, lights, locks, security cameras, thermostats, and similar devices. For example, home hub 150 is configured to utilize one or more security sensors 130 to detect intrusions (i.e. unauthorized entry) into a residential property (e.g., home 210 discussed below) to protect against theft, property damage, as well as personal protection against intruders. Home hub 150 is configured to capture inputs from security sensors 130, track alarm arm/disarm status, and detect intrusions (i.e. security events). In other embodiments, home hub 150 uses one or more wired and/or wireless protocols to communicate with security sensors 130. For example, home hub 150 is configured to be positioned proximate to perimeter 230 of home 210, within it, or both.

Security sensors 130 are smart devices configured to detect intrusions and may be positioned at the perimeter of the protected area (e.g., perimeter 230 of home 210), within it, or both. Aspects of security sensors 130 are configured to detect security events by a variety of methods, such as monitoring doors and windows for openings, or by monitoring unoccupied interiors for motions, sound, vibration, or other disturbances. Security sensors 130 are configured to be either active (i.e. require an external energy source) or passive (i.e. simply detects and responds to inputs from the physical environment). In some aspects, security sensors 130 can include, but are not limited to, hermetically sealed reed switches, passive infrared detectors, infrasound detectors, ultrasonic detectors, microwave detectors, compact surveillance radar, photoelectric beams, glass-break detectors, smoke detectors, heat detectors, motion sensors, security electric fences, similar sensor types, or a combination of two or more thereof.

In yet still other embodiments, computing device 140 is associated with the party that resides, manages, and/or owns home 210. In other embodiments, computing device 140 is associated with security personnel and/or a security corporation tasked with protecting home 210.

ID trap device 110 is a device configured to capture mobile device identification information of intruders. In some embodiments, ID trap device 110 can include one or more transceivers 118 and data stores 114 all interconnected via one or more control circuits 112. Control circuit 112 is central processing unit configured to implement computer instructions. Control circuit 112 is configured to perform the methods, steps, processes, and/or functions conveyed in the instant disclosure. Transceiver 118 is a device that includes both a RF receiver and a RF transmitter. Transceiver 118 is configured to communicate utilizing one or more wireless communications protocols, which include, but are not limited to, cellular networking protocols (e.g., LTE, CDMA, TDMA, 2G, 4G, 5G, etc.) and wireless networking protocols (e.g., Wi-Fi, Bluetooth, WLAN, 802.11b, 802.11g, 802.11a, etc.). Some aspects of transceiver 118 are configured emit RF signals to jam, block, or interfere with wireless communications within a given area.

Figure 2:
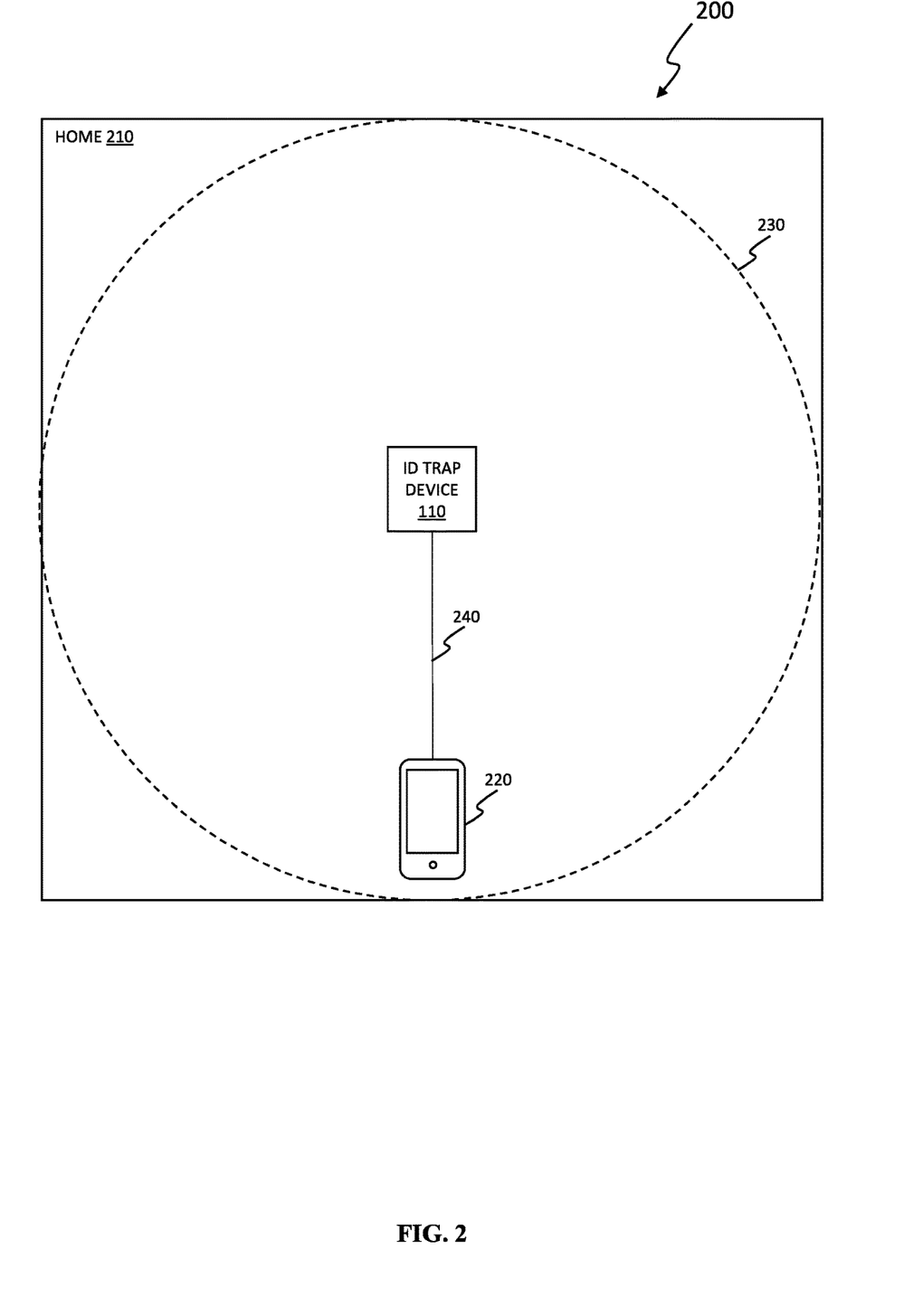
FIG. 2 illustrates a communications scheme according to some embodiments.
Figure 3:
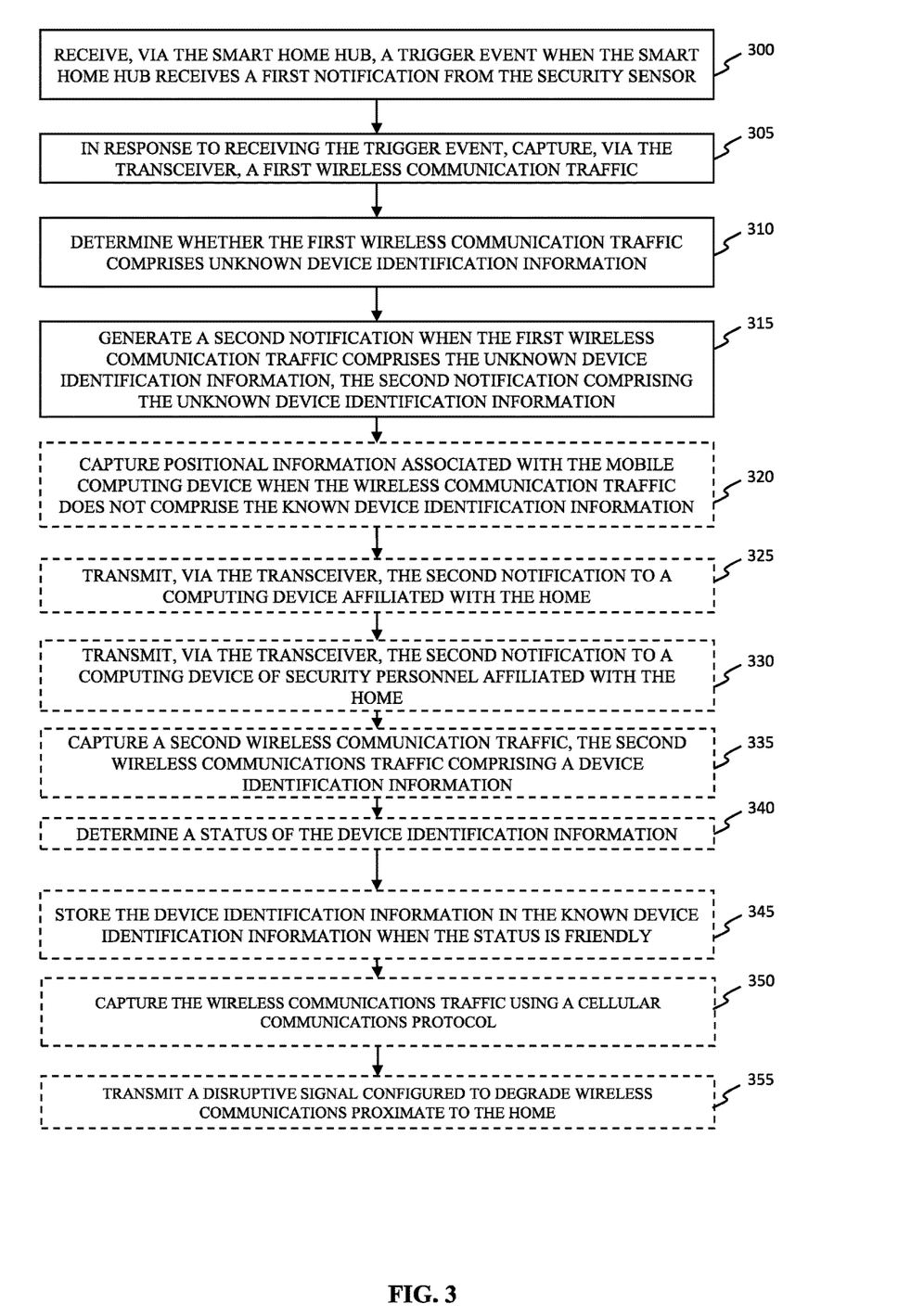
FIG. 3 depicts a flowchart of an exemplary method for detecting the presence of an intruder device in a home according to some embodiments.

Referring now to FIGS. 2 and 3. FIG. 2 illustrates a communications scheme for ID trap device 110 and unknown device 220. Specifically, FIG. 2 conveys that within home 210 (e.g., the property of interest), unknown device 220 must be within a threshold distance 230 of ID trap device 110 to communicate therewith via communications link 240. In other words, communications link 240 cannot be established until unknown device 220 is positioned within threshold distance 230. In certain embodiments, home 210 is a smart home. For example, FIG. 2 illustrates a situation where an intruder enters home 210 by an unauthorized means (e.g., entry through a broken window) and is carrying unknown device 220. In general, unknown device 220 is a mobile device (i.e. a computing device small enough to hold, operate in the hand, wear on the person, or a combination of two or more thereof).

FIG. 3 depicts a flowchart of a method for detecting the presence of unknown device 220 in home 210 according to some embodiments. At step 300, a trigger event is received, via home hub 150, in response to security sensor 130 detecting a security event. For example, security sensor 130 detects a security event (i.e. the broken window) and, in response, transmits notification of the security event to home hub 150. For example, the security events can include, but are not limited to, open doors, broken glass panes, open windows, heat signatures above a threshold value, and similar events. In response to receiving the notification, home hub 150 transmits (e.g., via communications link 240) a trigger event to ID trap device 110. At step 305, in response to receiving the trigger event, wireless communication traffic is captured. For example, wireless communication traffic is captured in an attempt to log traffic within perimeter 230. For example, wireless communication traffic associated with unknown device 220 is captured via communications link 240.

At step 310, whether the wireless communication traffic includes any unknown device identification information (i.e. identifying information of mobile devices not affiliated with home 210) is determined. For example, wireless communication traffic is structured in data packets of raw data that is decoded to thereby locate device identification information (e.g., media access control (MAC) addresses, integrated circuit card identifier ("ICCI") numbers, international mobile subscriber identity ("IMSI") numbers, as well as similar unique device identification information) included therein. Unknown device 220 transmits device identifying information (e.g., as a part of its normal operating procedures). At step 315, a notification is generated when the wireless communication traffic includes the unknown device identification information. For example, the notification includes the unknown device identification information, which is transmitted by unknown device 220, and is generated when the wireless communications traffic includes communications from unknown devices.

In other embodiments, data store 114 is an information repository (e.g. a database) configured to store, manage, and/or distribute information according to certain embodiments. For example, data store 114 includes files 116, which include known device identification information. As used herein, "known device identification information" refers to MAC addresses, ICCI numbers, international mobile subscriber identity numbers, and other unique device identifying information associated with mobile devices affiliated with home 210. At step 320, positional information (e.g., GPS data) associated with the mobile computing device is captured when the wireless communication traffic does not comprise the known device identification information. For example, the captured positional information establishes unknown device 220 proximity to home 210.

Such positional information can aid security personnel in correlating the location of device owner relative to home 210. For example, such information can be transmitted to law enforcement and/or other security personnel affiliated with home 210. In certain embodiments, law enforcement and/or other security personnel affiliated with home 210 are associated with, have access to, and/or communicate via computing device 140. At step 325, the second notification is transmitted, via transceiver 118, to a computing device affiliated with home 210 (e.g., computing device 145). For example, computing device 145 is a computing device (e.g., mobile computing device) associated with the owner, occupant, manager, etc. of home 210. Device identification information for computing device 145 is included in files 116. Aspects of computing device 145 include user interface 120. For example, user interface 120 is a graphical user interface that can convey notifications, receive status determinations, allow users to communicate with ID trap device 110. Certain aspects of user interface 120 are downloadable, for example, via network 160 or are accessible via a website.

At step 330, the second notification is transmitted, via the transceiver 118, to security personnel affiliated with home 210. At step 335, a second wireless communications traffic, which includes device identification information, is captured. At step 340, the status of the device identification information is determined. For example, the user of computing device 145 can determine the status of devices and transmit the determined status to ID trap device 110 for storage in files 116.

At step 345, the device identification information is stored in the known device information (i.e., files 116) when the status is "friendly." As used herein, a "friendly" status refers to devices (e.g., mobile device 145) that are affiliated with home 210 and an "unknown" status refers to devices that are not affiliated with home 210 (e.g., unknown device 220). At step 350, the wireless communications traffic is captured using one or more cellular communications protocols (discussed above). For example, the wireless communications traffic can include international mobile subscriber identity ("IMSI") numbers. At step 365, transmit, via transceiver 118, a disruptive signal (e.g., via communications line 240) configured to degrade wireless communications proximate to home 210. For example, disruptive signals are wireless signals configured to jam, block, and/or interfere with wireless communication.

Figure 4:
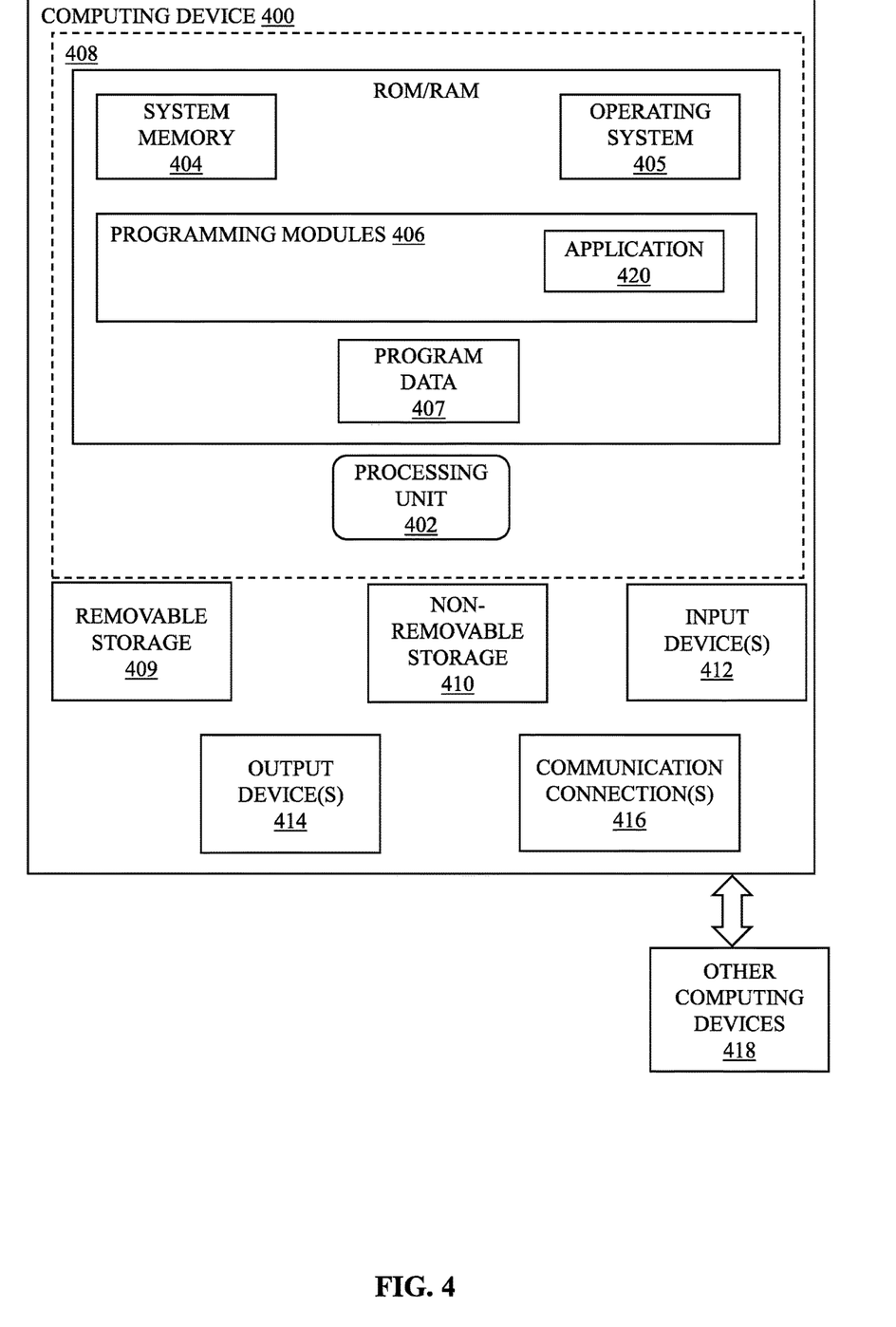
FIG. 4 is a block diagram of a computing device for implementing the methods disclosed herein according to some embodiments.

With reference to FIG. 4, a system consistent with an embodiment of the disclosure may include a computing device or cloud service, such as computing device 400. Computing device 400 can represent computing devices 140, 145, ID trap device 110, unknown device 220, or home hub 150. In a basic configuration, computing device 400 may include at least one processing unit 402 (e.g., control circuit 112) and a system memory 404. Depending on the configuration and type of computing device, system memory 404 may comprise, but is not limited to, volatile (e.g. random-access memory (RAM)), non-volatile (e.g. read-only memory (ROM)), flash memory, or any combination. System memory 404 may include operating system 405, one or more programming modules 406, and may include a program data 407. Operating system 405, for example, may be suitable for controlling computing device 400's operation. In one embodiment, programming modules 406 may include machine learning module. Furthermore, embodiments of the disclosure may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer-readable instructions, data structures, program modules, or other data. System memory 404, removable storage 409, and non-removable storage 410 are all computer storage media examples (i.e., memory storage.)

Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, a location sensor, a camera, a biometric sensor, etc. Output device(s) 414 such as a display, speakers, a printer, etc. may also be included. The aforementioned devices are examples and others may be used.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term "computer readable media" as used herein may include both storage media and communication media.

As stated above, a number of program modules and data files may be stored in system memory 404, including operating system 405. While executing on processing unit 402 (e.g., control circuit 112), programming modules 406 (e.g., user interface 120) may perform processes including, for example, one or more stages of methods, algorithms, systems, applications, servers, databases as described above. The aforementioned process is an example, and processing unit 402 (e.g., control circuit 112) may perform other processes. Other programming modules that may be used in accordance with embodiments of the present disclosure may include machine learning application.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the disclosure has been explained in relation to its preferred embodiment, it is to be understood that many other possible modifications and variations can be made without departing from the spirit and scope of the disclosure.

What is claimed is:

1. A system to detect a presence of an intruder device in a home environment, the system comprising:
    a home hub positioned proximate to a home;
    a security sensor positioned proximate to the home and communicatively coupled to the home hub;
    a transceiver;
    a control circuit communicatively coupled to the home hub, a database, and the transceiver;
    wherein the security sensor is configured:
        to detect a security event associated with the home;
        transmit a first notification of the security event to the home hub;
    wherein the control circuit is configured to:
        receive, via the home hub, a trigger events when the home hub receives the first notification;
        in response to receiving the trigger event, capture, via the transceiver, a first wireless communication traffic;
        determine whether the first wireless communication traffic comprises unknown device identification information; and
        generate a second notification when the first wireless communication traffic comprises the unknown device identification information, the second notification comprising the unknown device identification information;
    the control circuit is configured to capture the wireless communications traffic using cellular communications protocol;
    the wireless communications traffic comprises and international mobile subscriber identity number;
    wherein the control circuit is configured to transmit a disruptive signal configured to degrade wireless communications proximate to the home.

2. The system of claim 1, wherein the security event comprises an open door.

3. The system of claim 1, wherein the security event comprises a broken glass pane.

4. The system of claim 1, wherein the security event comprises an open window.

5. The system of claim 1, wherein the security event comprises a heat signature above a threshold value.

6. The system of claim 1, wherein the wireless communication traffic comprises a media access control address.

7. The system of claim 1, wherein the wireless communication traffic comprises an integrated circuit card identifier number.

8. The system of claim 1, wherein the wireless communication traffic comprises an international mobile equipment subscriber number.

9. The system of claim 1, further comprising:
    a data store comprising known device identification information affiliated with the home; and
    wherein in determining whether the first wireless communication traffic comprises the unknown device identification information the control circuit is configured to capture a positional information associated with the mobile computing device when the wireless communication traffic does not comprise the known device identification information.

10. The system of claim 1, wherein the control circuit is configured to transmit, via the transceiver, the notification to a computing device affiliated with the home.

11. The system of claim 1, wherein
    the control circuit is configured to transmit, via the transceiver, the notification to a computing device associated with security personnel; and
    the security personnel is affiliated with the home.

12. The system of claim 9, wherein the control circuit is configured to:
    capture a second wireless communication traffic, the second wireless communications traffic comprising a device identification information;
    determine a status of the device identification information; and
    store the device identification information in the known device identification information when the status is friendly.

* * * * *